United States Patent
Goenner

(10) Patent No.: US 10,416,025 B1
(45) Date of Patent: Sep. 17, 2019

(54) ELECTRICALLY ISOLATED VIBRATION SENSOR

(71) Applicant: Meggitt (Maryland), Inc., Germantown, MD (US)

(72) Inventor: Matthew C. Goenner, Rockville, MD (US)

(73) Assignee: Amphenol (Maryland), Inc., Germantown, MD (US)

(*) Notice: Subject to any disclaimer, the term of this patent is extended or adjusted under 35 U.S.C. 154(b) by 707 days.

(21) Appl. No.: 14/525,791

(22) Filed: Oct. 28, 2014

Related U.S. Application Data

(60) Provisional application No. 61/896,359, filed on Oct. 28, 2013.

(51) Int. Cl.
*G01H 11/06* (2006.01)

(52) U.S. Cl.
CPC .................................. *G01H 11/06* (2013.01)

(58) Field of Classification Search
CPC ... H01R 4/00; H01R 4/22; H01R 9/00; H01R 13/46; H01R 13/50; H01R 13/502; H01R 13/514; H01R 13/516; H01R 13/622; H01R 13/623; H01R 13/627; G01D 11/24; G01D 11/245; G01N 29/223; G01N 29/227; G01N 29/228; G01N 29/2475; G01N 2291/2696; G01M 13/00; G01M 13/04; G01M 13/045; G01M 13/028
USPC .......................................... 73/658, 660, 661
See application file for complete search history.

(56) References Cited

U.S. PATENT DOCUMENTS

| | | | | | |
|---|---|---|---|---|---|
| 3,351,787 | A | * | 11/1967 | Kistler | B06B 1/0618 29/595 |
| 3,914,862 | A | * | 10/1975 | McBride, Jr. | G01F 23/247 29/612 |
| 4,016,752 | A | * | 4/1977 | Carey | G01H 1/003 73/652 |
| 4,336,707 | A | * | 6/1982 | Yamaguchi | G01L 23/223 310/25 |
| 4,471,475 | A | * | 9/1984 | Brunson | B06B 1/0603 181/401 |
| 4,660,409 | A | * | 4/1987 | Miyata | G01L 23/222 310/329 |
| 4,704,894 | A | * | 11/1987 | Inuzuka | G01L 23/222 310/326 |
| 4,821,244 | A | * | 4/1989 | Wood | B06B 1/0655 310/337 |
| 4,823,602 | A | * | 4/1989 | Christensen, Jr. | G01H 11/06 73/661 |

(Continued)

OTHER PUBLICATIONS

Meggitt Sensing Systems, Isolator Bases for Accelerometers SF21, SF22, SF23, SF24, 2 pages, 1993.

*Primary Examiner* — Helen C Kwok
(74) *Attorney, Agent, or Firm* — Blank Rome LLP

(57) ABSTRACT

A vibration sensor is electrically isolated from the mounting surface of the device or equipment to which it is attached. The isolation provides protection from excess voltages present on the mounting surface that could damage the internal components of the vibration sensor or auxiliary equipment attached to the vibration sensor. The isolation is provided by a non-conductive amorphous solid or crystalline material between the mounting base and the case and between the case and the sensing element to protect the sensor.

19 Claims, 4 Drawing Sheets

(56) References Cited

U.S. PATENT DOCUMENTS

| | | | | |
|---|---|---|---|---|
| 4,869,095 A * | 9/1989 | Komurasaki | G01H 11/08 | 310/329 |
| 4,922,754 A * | 5/1990 | Horne | G01N 29/14 | 73/587 |
| 4,961,338 A * | 10/1990 | Komurasaki | G01L 23/222 | 310/329 |
| 4,978,883 A * | 12/1990 | Komurasaki | G01H 11/08 | 310/329 |
| 4,982,599 A * | 1/1991 | Komurasaki | G01P 15/0907 | 310/329 |
| 5,015,194 A * | 5/1991 | Seas | H01R 13/625 | 439/314 |
| 5,021,737 A * | 6/1991 | Schutts | G01V 3/101 | 324/207.11 |
| 5,122,740 A * | 6/1992 | Cottam | G01P 1/026 | 310/168 |
| 5,176,034 A * | 1/1993 | Hazony | G01B 17/02 | 73/597 |
| 5,212,421 A * | 5/1993 | Hatton | G01H 11/08 | 310/324 |
| 5,225,731 A * | 7/1993 | Owen | H01L 41/0926 | 310/357 |
| 5,230,238 A * | 7/1993 | Takeuchi | F02F 11/002 | 73/35.11 |
| 5,231,880 A * | 8/1993 | Ward | G01L 9/0022 | 310/338 |
| 5,456,116 A * | 10/1995 | Lew | G01F 1/86 | 310/338 |
| 5,473,941 A | 12/1995 | Judd et al. | | |
| 5,559,280 A * | 9/1996 | Kovacich | G01L 23/18 | 73/35.13 |
| 5,578,759 A * | 11/1996 | Clayton | G01K 7/32 | 310/338 |
| 5,663,504 A * | 9/1997 | Kluft | G01H 1/003 | 73/1.82 |
| 5,712,562 A * | 1/1998 | Berg | G01B 7/001 | 174/528 |
| 5,770,941 A * | 6/1998 | Van Den Berg | B29C 33/123 | 174/520 |
| 5,818,224 A * | 10/1998 | Van Den Berg | B29C 33/12 | 174/521 |
| 6,079,275 A * | 6/2000 | Komninos | G01H 1/00 | 73/661 |
| 6,109,112 A * | 8/2000 | Borza | F41H 11/12 | 73/661 |
| 6,112,577 A * | 9/2000 | Kawajiri | G01L 23/222 | 73/35.11 |
| 6,131,462 A * | 10/2000 | EerNisse | G01L 19/0092 | 73/702 |
| 6,386,036 B1 * | 5/2002 | Borza | F41H 11/12 | 367/87 |
| 6,533,494 B1 * | 3/2003 | Gordon | F16B 11/006 | 403/187 |
| 6,575,048 B1 * | 6/2003 | Tow | G01D 11/30 | 73/756 |
| 6,776,026 B1 * | 8/2004 | Barron | G01L 23/222 | 73/35.11 |
| 6,781,814 B1 * | 8/2004 | Greene | G01L 9/0075 | 361/283.1 |
| 6,923,063 B2 * | 8/2005 | Komninos | G01N 29/14 | 73/587 |
| 7,392,705 B2 * | 7/2008 | Kawashima | G01S 7/521 | 310/336 |
| 8,051,712 B2 * | 11/2011 | Younsi | G01P 1/023 | 73/493 |
| 2003/0094051 A1 * | 5/2003 | Steinberg | G08B 13/122 | 73/761 |
| 2004/0185702 A1 * | 9/2004 | Kurtz | H01R 13/533 | 439/382 |
| 2011/0296925 A1 * | 12/2011 | Miesel | G01L 9/0072 | 73/718 |
| 2013/0307094 A1 * | 11/2013 | Yoshiuchi | G01C 19/5783 | 257/415 |
| 2014/0112507 A1 * | 4/2014 | van Halteren | H04R 1/326 | 381/313 |

\* cited by examiner

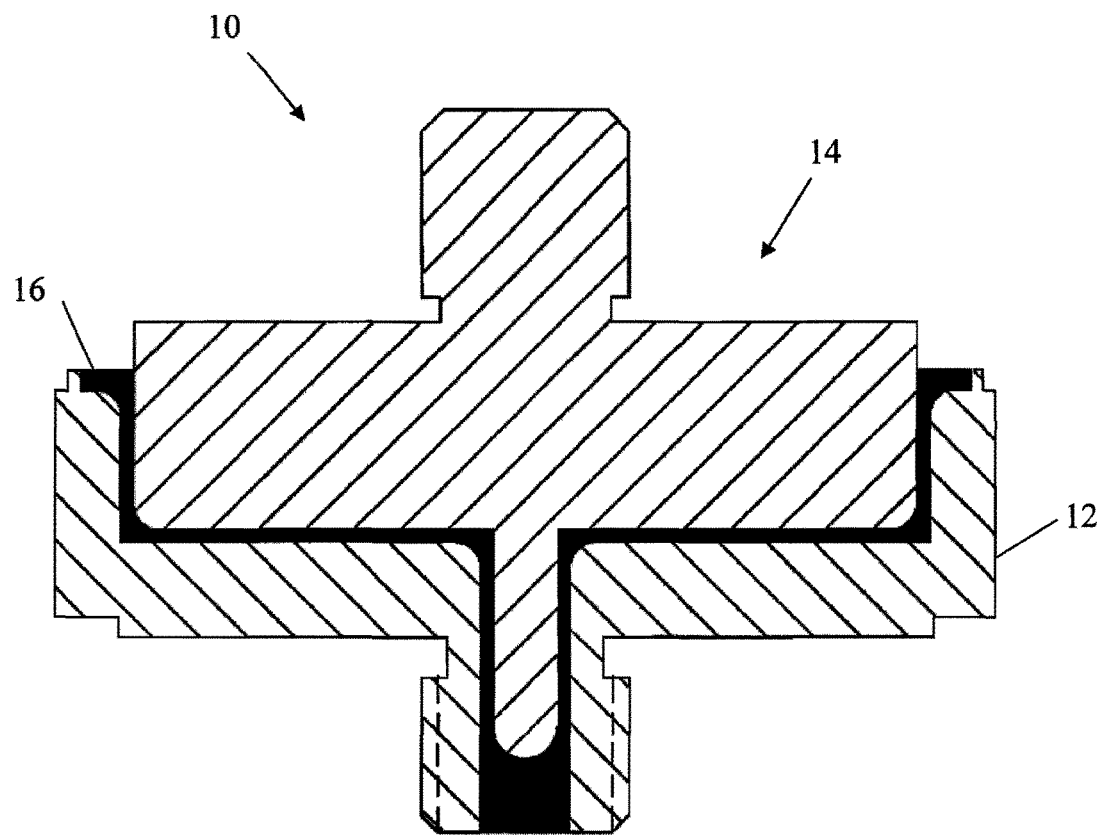
Figure 4 – PRIOR ART, Isolation

ELECTRICALLY ISOLATED VIBRATION SENSOR

RELATED APPLICATIONS

The present application claims priority to provisional application 61/896,359, filed Oct. 28, 2013, the entire contents of which is hereby incorporated by reference.

BACKGROUND OF THE INVENTION

Field of the Invention

A vibration sensor design capable of withstanding large potential difference between its mounting surface, its electro-magnetic shielded case and electronics.

Description of the Related Art

Vibration sensors are used in many environments and for many applications where there may be DC or AC voltages present on the surface to which they are mounted that are at a different potential than the measurement instruments that the vibration sensor is connected to. As most vibration sensors have cases constructed of metal, any voltage present on the mounting surface will be conducted to the case and to anything connected to the case either directly or through capacitive coupling such as the vibration sensor's internal components, external cabling, or measurement instruments. These internal or external components could be damaged if the voltage or current leakage is high enough, and these voltages present a safety risk for any operators who may touch the cables or measurement instruments.

There could also be damaging voltage present on the pins at the electrical connection to the sensor. These damaging voltages are carried by the connected auxiliary equipment and could be due to a direct or nearby lightning strike, equipment malfunction or improper installation, among many possible causes. These voltages could damage the internal components of the vibration sensor if it is not protected in some way.

In some applications, such as wind turbines, the machines are comprised of generators and gearboxes that are located in nacelles mounted on towers making them particularly susceptible to lightning strikes. Furthermore, these generators may experience leakage, induction, or capacitive coupling with the windings of the motor resulting in large potential differences between the generator armature, housing and earth ground.

It is possible for large electrical transient events to cause damage to the vibration sensors and measurement instruments. It is also possible that the vibration sensors and associated cabling may provide a current path from the generator to ground. During transient events, these currents may be large and may cause physical damage to the rolling elements (bearings) located within the generator and transmissions of the wind turbine.

State of the art internal isolation techniques have insufficiently addressed this issue by providing isolation between the electronics and the mounting base through the use of plastics, epoxies, acrylics, ceramics, glass, tape, etc. However, due to the close spacing of components inside the sensor, this isolation is typically less than 500 Vac or 1000 Vdc. The transient voltage events in wind turbines often exceed this level of isolation, causing an arc that may damage the sensor, the measurement instruments and the rolling elements of the generator.

The state of the art external isolation techniques used to mount the sensor include the use of plastics, epoxies, acrylics, ceramics, glass, tape, etc. that are inserted between the sensor and its mounting surface in the form of a separate isolation pad. These state of the art techniques have been able to provide high voltage isolation or good vibration signal coupling, but not both. State of the art approaches typically have limited voltage isolation due to short creepage paths between the conductive portions of the sensor and mounting base. Increasing the size of the isolating material reduces the vibration-coupling performance of the sensor and significantly increases the weight. Solutions that meet the high voltage isolation required have mechanical damping properties that reduce the performance of the sensor by de-sensitizing it at certain frequencies or by lowering its mechanical resonance.

Referring to FIG. 4, the current state of the art is shown to prevent damaging voltages being present on a vibration sensor case through the use of special separate adaptors that provide electrical isolation. The adapter 10 includes a mounting base 12 for attachment to the equipment to be monitored and a vibration sensor mounting pad 14. The equipment mounting base 12 sits between the vibration sensor mount 14 and the mounting surface of the device being monitored. An electrically-insulating, self-spacing, epoxy/glass bead mixture 16 is placed between the sensor (not shown, but which is threadably mounted to the mounting pad 14) and mounting base 12 to provide electrical isolation between the two parts. This state of the art isolation is available commercially from Meggitt Sensing Systems, Isolator Bases for Accelerometers SF21, SF22, SF23, SF24. Being a separate part, these adaptors 10 have certain detrimental effects such as additional cost, additional installation time and effort, additional required height and a poorer frequency response.

U.S. Pat. No. 5,473,941 to Judd provides an encapsulated accelerometer with Faraday Shielding. However, the insulating epoxy encapsulant is relatively soft, and the frequency response of the sensor relies on vibration transmission through the encapsulant, which damps the vibrations and lowers the bandwidth of the sensor. In addition, epoxy encapsulants change their stiffness with temperature, softening even more at elevated temperatures.

SUMMARY OF THE INVENTION

It is one purpose of the invention to provide a novel scheme for an improved vibration sensor that is electrically isolated from the surface on which it is mounted and provides protection from excessive voltages present on its connection pins to protect its internal components and any auxiliary equipment that may be connected to it from voltage present on said surface. In one embodiment, the vibration sensor is electrically isolated by a non-conductive material between the mounting base and the internal components. In another embodiment, the electrical isolation of the vibration sensor is achieved by a non-conductive material between the case and the sensing element. In another embodiment, the electrical isolation is provided by a combination of materials between the mounting base and case and between the case and the sensing element. The present invention provides the function of the isolating mounting pad by integrating it into the sensor and by improving upon its voltage resistance and frequency response properties. In addition, the present invention has stiff materials that preserve sensor frequency response while increasing isolation between the sensor, case and mounting base.

BRIEF DESCRIPTION OF THE DRAWINGS

FIG. 4 shows the state of the art for electrically isolating the sensor from mounting surfaces.

DETAILED DESCRIPTION OF THE PREFERRED EMBODIMENTS

Figure 1:
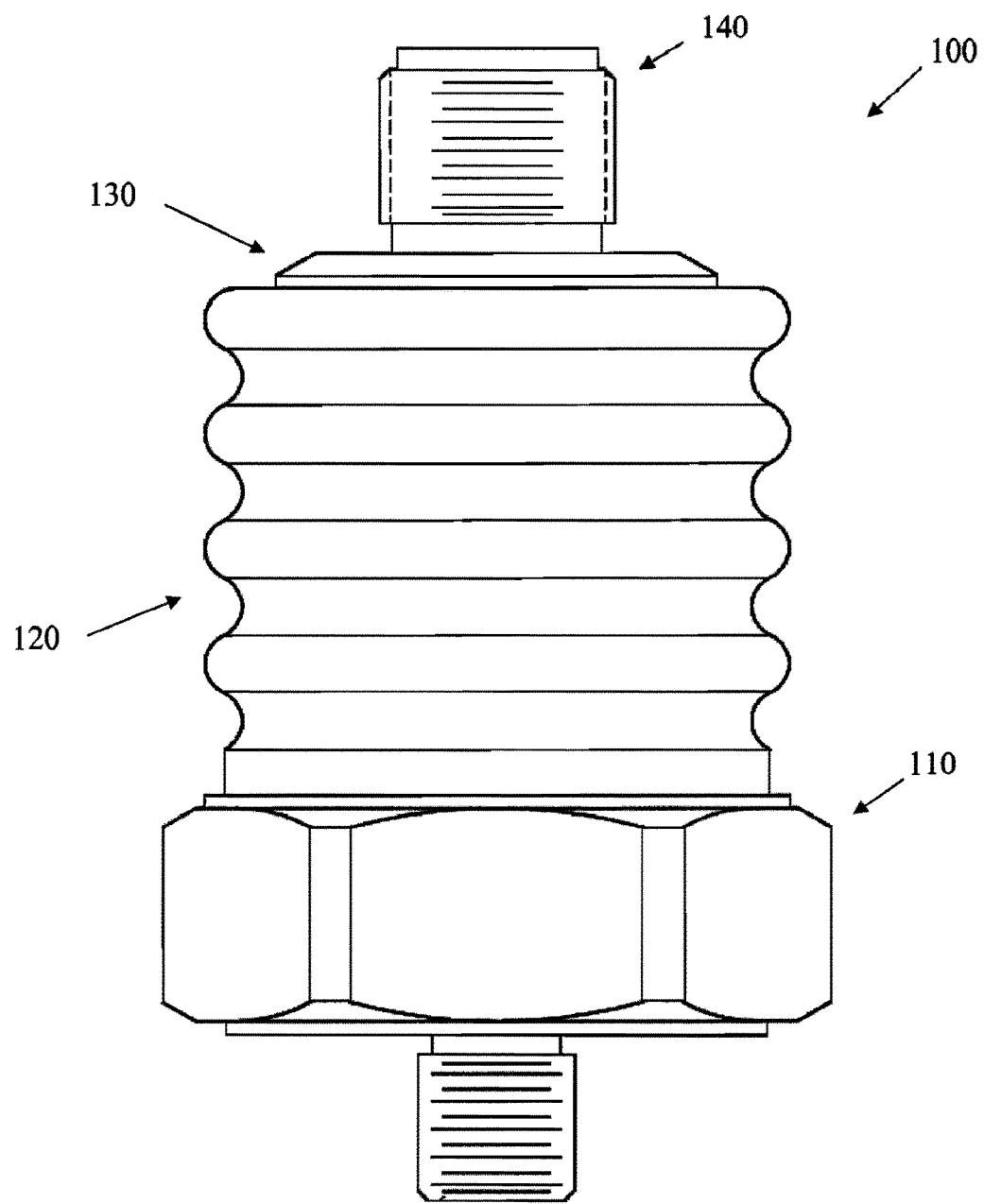
FIG. 1 is a side view of the isolated vibration sensor.

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

Figure 2:
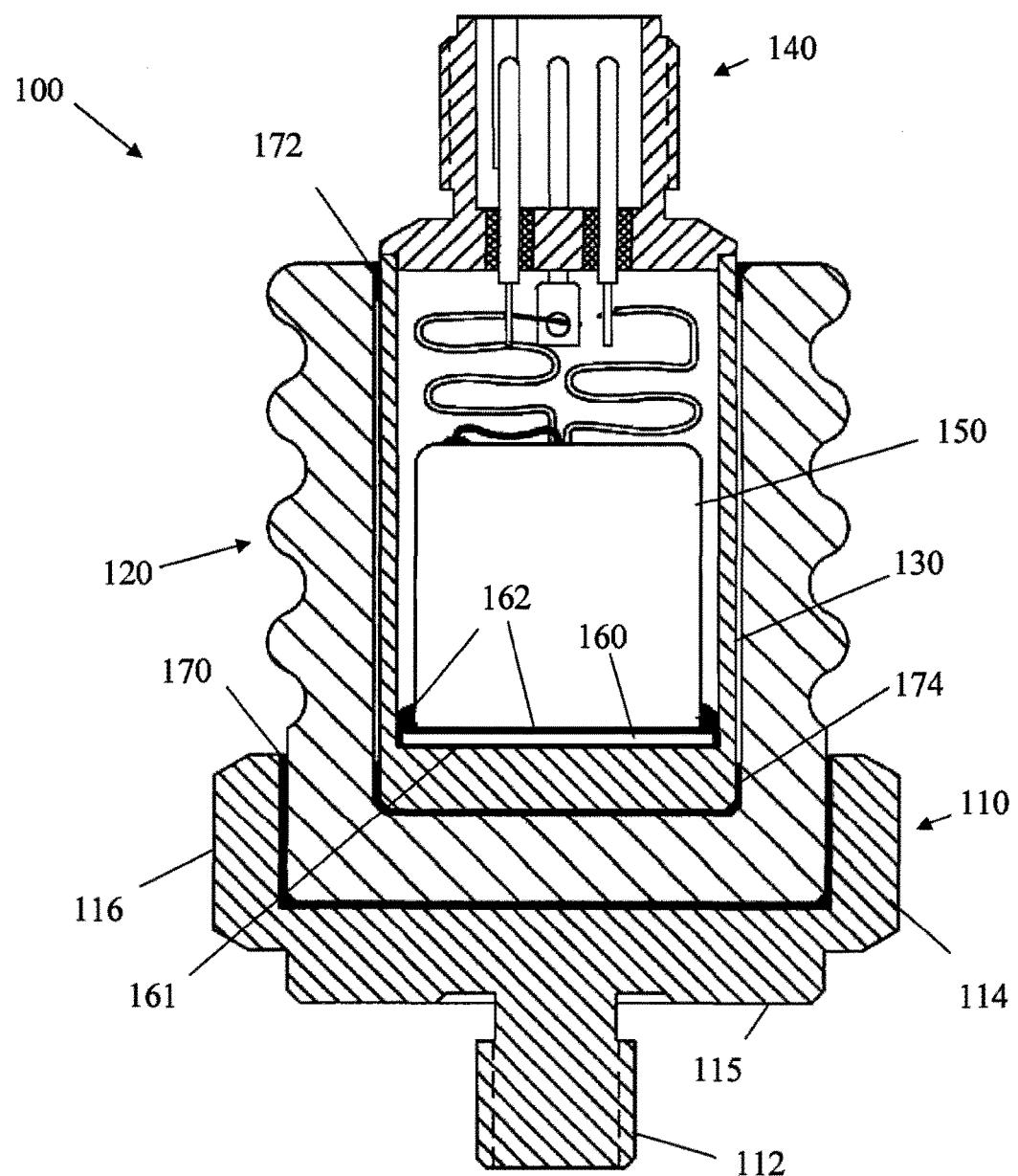
FIG. 2 is a cross-sectional drawing of the isolated vibration sensor.
Figure 3:
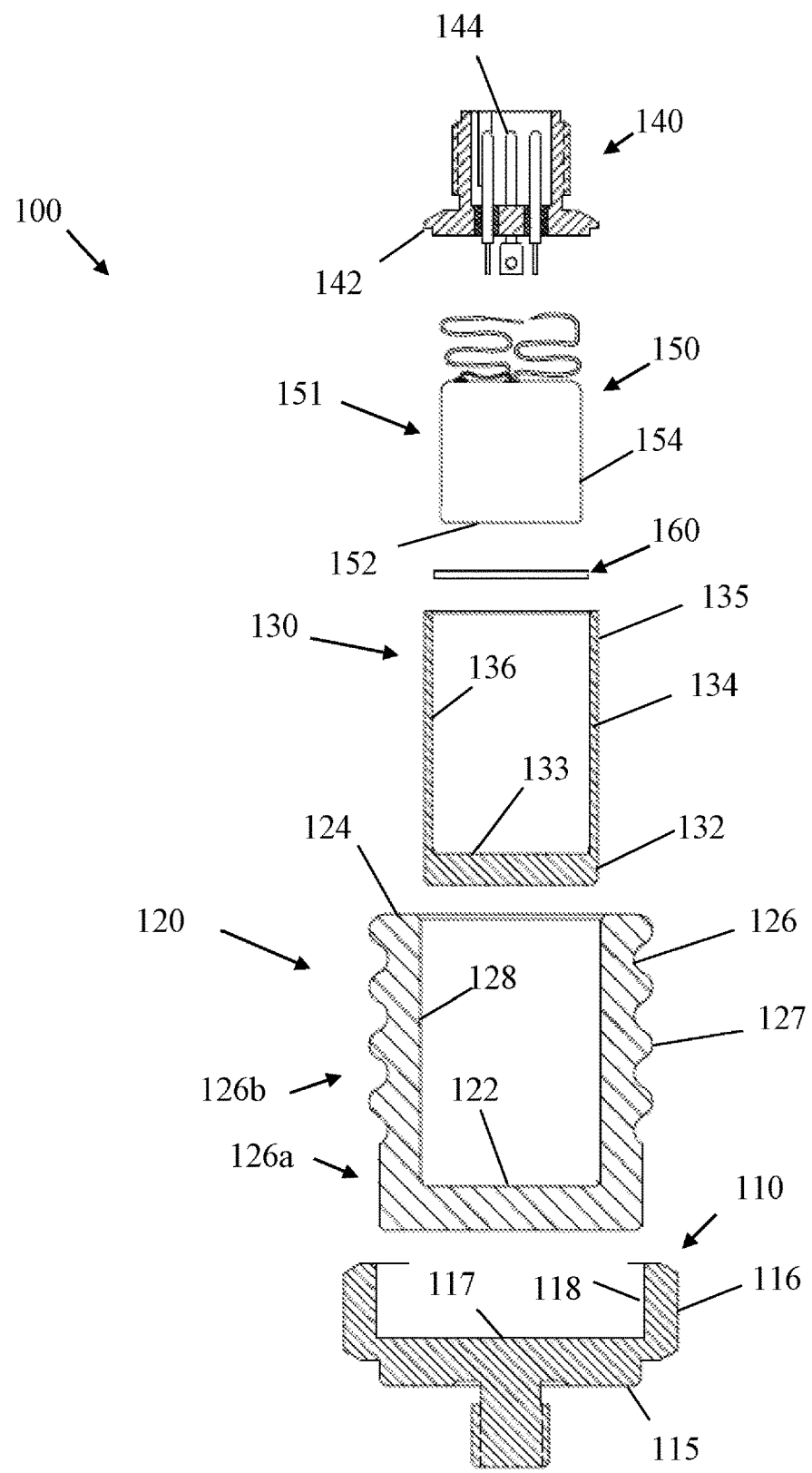
FIG. 3 is an exploded cross-sectional drawing of the isolated vibration sensor.

Referring to the drawings, FIGS. 1-3 show a vibration sensor assembly 100 in accordance with an embodiment of the present invention. The vibration sensor assembly 100 generally includes a mounting base 110, cup 120, and case 130. A sensing element 150 is contained within the case 130, and is electrically connected to a connector 140 at the exterior of the case 130. As best shown in FIG. 2, a first electrically insulative pad 160 is located between the sensing element 150 and the interior of the case 130. And, a second electrically insulative pad 170 is located between the cup 120 and the mounting base 110.

The mounting base 110 is secured to a device to be monitored by the sensor assembly 100. In the embodiment shown, the mounting base 110 is a one-piece member having a main body portion 114 and a threaded stud 112. The threaded stud is provided so that the sensor assembly 100 can be secured to a device to be monitored by the sensor assembly 100, such as to the mounting surface of equipment or the like. Of course, the mounting base 110 can be secured to the monitored device in any suitable manner, such as by being fastened by adhesive or the like, and a threaded stud 112 need not be utilized. The threaded stud 112 could also be replaced with a tapped hole.

The main body portion 114 includes a bottom portion 115 and one or more side wall portion(s) 116. In the current embodiment, the mounting base 110 has a circular shape, so there is a single side wall portion 116. However, the mounting base 110 can have other suitable shapes, such as a square with multiple side walls 116. The bottom portion 115 is substantially flat and the side wall portion 116 extends substantially perpendicularly upward from the outer circumference of the bottom portion 115. The bottom portion 115 and side wall portion 116 define an interior space, with the bottom portion 115 having an interior-facing top surface 117 and the side wall portion 116 having an interior-facing interior surface 118. Thus, the mounting base 110 has a general U-shape cross-section with sharp bottom corners (instead of curves), and with a short side wall portion 116 relative to the width of the bottom portion 115. The distal end of the mounting base 110 forms an open end between the side wall portion 116.

The cup 120 is a one-piece member having a bottom portion 122 and elongated side wall portion(s) 124. Thus, the cup 120 is circular with a general cup or U-shape cross-section with slightly curved interior and exterior bottom corners and an elongated side wall 116. The curved corners provide stress relief and moldability. In the current embodiment, the cup 120 has a circular shape to match the shape of the mounting base 110, so there is a single side wall portion 124. However, the cup 120 can have other suitable shapes, such as a square with multiple side walls 124. The bottom portion 122 is substantially flat and the side wall portion 124 extends substantially perpendicularly upward from the outer circumference of the bottom portion 122. The bottom portion 122 and side wall portion 124 define an interior space, with the bottom portion 122 having an interior-facing top surface 129 and the side wall portion 124 having an interior-facing interior surface. The distal end of the cup 120 forms an open end between the side wall portion(s) 124.

The cup 120 and mounting base 110 are sized and shaped so that the cup 120 can be at least partially received in the interior space of the mounting base 110 between the side wall portion(s) 116. Thus, the outer diameter of the cup 120 is slightly smaller than the inner diameter of the mounting base 110 so that the cup 120 comfortably fits inside the mounting base 110. The cup side wall 124 is much longer than the mounting base side wall 116. Accordingly, the cup side wall 124 extends upward beyond the distal ends of the mounting base side wall 116. The exterior or outer surface 126 of the cup side wall 124 has a lower section 126a and a contiguous integrally formed mid- to upper-section 126b. The lower section 126a of the cup side wall 124 is received in the interior space of the mounting base 110, and is straight to readily be received in the interior space of the mounting base 110. The mid or upper section 126b of the outer surface 126 is curved to form ridges such as glazed flutes or grooves 127. The grooves 127 are positioned around the outer periphery, and extend transversely with respect to the longitudinal axis of the cup 120. Each groove 127 is approximately $\frac{1}{10}^{th}$ the overall height of the cup 120. The grooves 127 maximize the surface area of the outer surface 126 of the cup 120 for the size of the sensor 150. The grooves 127 each have a radius of about $\frac{1}{15}$ of the height of the cup 120, with a tip-to-trough distance of about 2 radii and a tip-to-trough depth of about 1 radius. Other suitable shapes and sizes can be provided, such as a trip-to-trough distance of about 0.02-1.0 inches and a depth of about 0.010 to 0.5 inches. The grooves 127 increase the distance of any conduction paths between the mounting base 110 and the connector 140 due to the buildup of dirt or contamination. The geometry (of the grooves 127) maximizes the creepage distance over the surface of the product. That prevents a charge from passing along the outer surface 126 because the convolutions prevent voltage tracking along the insulator's surface when it gets wet or dirty. The cup 120 has a central bore to form an interior space. The interior surface 128 of the side wall 124 and top interior-facing surface 129 of the bottom 122 are straight, and the bottom corners can be slightly curved.

The bottom portion 122 is flat, with both a flat top interior surface 129 and a flat bottom exterior surface. In addition, the lower section 126a of the cup exterior side wall surface 126 is straight and the mounting base side wall interior surface 118 is straight. Accordingly, the flat bottom exterior surface mates with the flat top surface 117 of the mounting base 110 and the two surfaces can be reliably adhered together by the adhesive 170. And, the straight mounting base side wall interior surface 118 and the straight cup exterior lower surface 126*a* mate can be reliably adhered together by the adhesive 170.

The cup 120 is electrically insulating and is positioned between the mounting base 110 and the case 130. The cup 120 can be bonded to the mounting base 110 and to the case 130 with an adhesive 170 (FIG. 2) that may also be electrically insulating. The cup 120 prevents voltage present on the mounting base 110 from reaching either the case 130 and hence the connector 140 or the sensing element 150. This prevents damage to any external equipment attached to the sensor 150 or to the sensor's internal components. Ideally, the cup 120 is mechanically rigid to improve the frequency response of the vibration sensor 150. A mechanically soft electrically insulation material such as rubber would be too soft to allow measurement of high-frequency vibration signals. The cup 120 wall thickness is approximately ⅓ of the height, and can be about 0.010 to 0.5 inches. With a dielectric strength of at least 250 volts per 0.001" of thickness, there is adequate electrical isolation with a thin wall. That configuration provides insulation up to over 5,000 volts. The cup 120 is a rigid material and preserves sensor frequency response while providing isolation between the sensor 150, case 130, and mounting base 110.

To provide a cost-effective, integral approach to a mounting base isolated accelerometer, a number of design criteria apply. The isolation materials (120, 160, 170, 174) shall: (a) have a high mechanical stiffness or rigidity to provide good vibration signal coupling between the mounting surface and the vibration sensing element; (b) provide a high dielectric strength to withstand the flow of electricity due to high electric potentials; (c) low dielectric loss; (d) have sufficient surface area to prevent contamination buildup from causing leakage paths over the surface of the material; (e) provide a very low capacitive connection to prevent the conduction of pulsed energy, such is common in electrostatic discharge, electrical fast transients, and surge phenomena; (f) resist breakdown or degradation due to oils or solvents; (g) resist deterioration in ultraviolet light; (h) be very stable in properties over temperature; (i) have low porosity; (j) have low hydroscopic properties; have a high glass transition temperature; (k) resist cracking due to large mechanical shocks; and (l) be commercially available and reasonably low-cost.

In one embodiment, the cup 120 is formed from an amorphous solid form of $MgO:XSiO_2$ (magnesium silicate where X denotes the average mole ratio of $SiO_2$ to MgO) material that is both electrically insulating with a high dielectric constant, low dielectric loss, high dielectric strength, high volume resistivity, stable properties over temperature, low UV degradation, high chemical resistance, high glass transition temperature, low hydroscopy, low porosity and mechanically stiff. Other suitable materials include for instance alumina ($Al2O3$) ceramics, Cordierite, Forsterite, Magnesium Oxide, Mullite though these can be economically prohibitive. A Steatite ceramic material consisting predominantly of magnesium silicate can be used, Steatite is a silicate-ceramic composed of 58-65% SiO2, 26-32% MgO, 3-6% Al2O3. The Steatite is better suited to the invention than plastics or polymers, though plastics may be suitable for certain applications. Steatite has several advantages, including that the Steatite has: (a) high mechanical stiffness, with stability of the stiffness over temperature, (b) high stability of all properties over temperature, (c) high stability over time under UV exposure, (d) high resistance to chemicals, (e) very high glass transition, (f) very low porosity, and (g) very low hydroscopic properties. Notably, the Steatite material is weaker than plastics in some areas, such as (a) loss tangent is higher than plastics and will dissipate more energy as heat, (b) dielectric coefficient is higher than plastics, which will produce more capacitance, (c) dielectric strength is lower than plastics, which will arc sooner, and (d) volume resistivity is lower than plastics, which will leak more. However, these drawbacks may be suitable for many applications of the invention. However, the Steatite is very stiff, which is advantageous to avoid interfering with the vibrations detected by the sensing element 150. It also has good insulating properties, and is very stable in the environment (UV, water, chemicals, temperature), and a low cost.

Other isolation materials and approaches might also be suitable depending on the specific application, such as polymers, ceramics, glass, thin-film tapes, epoxies, potting compounds, conformal coatings or the use of overmolding or isolated surface plating techniques.

The case 130 is a one-piece member having a bottom portion 132 and elongated side wall portion(s) 134. The case 130 is circular with a general cup or U-shape cross-section with slightly exterior and interior curved bottom corners and an elongated side wall 134. The case 130 is received in the interior space of the cup 120 between the side wall portion(s) 124. The case side wall 134 is slightly longer than the interior length of the cup side wall 124, so that the top distal end 135 extends beyond the top distal end of the cup side wall 124, as best shown in FIG. 2. The case side wall 134 is thin, while the case bottom portion 132 can be thicker. In one embodiment, the inside can be sandblasted to increase epoxy bonding strength, so the case 130 needs to be thick enough to withstand that without warping.

In the current embodiment, the case 130 has a circular shape to match the shape of the interior space of the cup 120, so there is a single side wall portion 134. However, the case 130 can have other suitable shapes, such as a square with multiple side walls 134. The bottom portion 132 is substantially flat and the side wall portion 134 extends substantially perpendicularly upward from the outer circumference of the bottom portion 132. The bottom portion 132 and the side wall portion 134 define an interior space, with the bottom portion 132 having an interior-facing top surface 133 and the side wall portion 134 having an interior-facing interior surface 136. Thus, the case 130 has a general U-shape cross-section with curved outer bottom corners and sharp interior bottom corners, and with an elongated side wall portion 134 relative to the width of the bottom portion 132. The distal end 135 of the case 130 forms an open end between the side wall portion(s) 134.

The case 130 and the cup 120 are sized and shaped so that the case 130 can be at least partially received in the interior space of the cup 120 between the side wall portion(s) 124 and so that the case 130 and the cup 120 can be reliably coupled together. The case 130 can be fastened to the cup 120 by any suitable means, such as by an adhesive bond 172, 174 press fit, or sintering. The first adhesive bond 174 is applied at the inside bottom of the cup 120 and outside bottom of the case 130, and a second adhesive bond 172 is applied at the distal end of the cup 120 about the case 130. The first bond 174 can extend up the sides of the case 130. However, there is preferably a gap between the two adhesive bonds 172, 174 to allow for thermal expansion. The outer diameter of the case 130 is slightly smaller than the inner diameter of the cup 120 side walls so that the case 130 can be received within the cup 120.

The case bottom portion 132 is flat, with both a flat top interior surface 133 and a flat bottom exterior surface. In addition, the side wall(s) 134 is flat, with a straight exterior surface and straight interior surface, and the cup side wall interior surface 128 is straight. Accordingly, the flat case bottom exterior surface mates with the flat top surface 122 of the cup 120, and the two surfaces can be reliably adhered together by the adhesive bond 174. And, the straight cup side wall interior surface 128 and the straight case exterior surface can be reliably adhered together by the adhesive 172. Adhesives 172 and 174 can be replaced with a press fit connection or a sintered connection.

The case 130 is metal so that the connector 140 can be welded to it to form a hermetic seal. The case 130 also serves as an electro-magnetic Farady cage. The Faraday cage shields the sensing element 150 from electrical and magnetic fields that could corrupt the measurements or destroy the sensing element. The hermetic seal prevents the intrusion of gases, liquids, or contaminates which could damage the sensing element 150. Additionally the atmosphere in the sealed 130 case is often Argon or other suitably noble gas.

The sensing element 150 is received in the interior space of the case 130 between the side wall portion(s) 134. In the current embodiment, the sensing element 150 has a closed housing 151 with top, bottom and side wall(s), and with a circular shape to match the shape of the interior space of the case 130. However, sensor 150 can have other suitable shapes, such as a square. The bottom 152 is substantially flat and the side wall portion 154 extends substantially perpendicularly upward from the outer circumference of the bottom portion 152. The sensing element housing 151 and the case 130 are sized and shaped so that the sensing element housing 151 can be fully received in the interior space of the case 130 between the side wall portion(s) 134. Thus, the outer diameter of the sensing element housing 151 is slightly smaller than the inner diameter of the case side walls 134. The sensor 150 is spaced away from the interior wall of the case 130 in order to maintain electrical isolation between the two. Actual spacing is dependent on the level of voltage isolation required between the sensing element 150 and the case 130, but typically at least 0.030 inches.

The vibration sensor 150 is a single integral member that provides all elements necessary to provide vibration sensing and electrical isolation. Only one mounting step is necessary to provide vibration sensing and electrical isolation, so that the user does not need to mount electrical isolation separately from vibration sensing. That is, in the state of the art shown in FIG. 4, a two-step process is required because it is necessary to first torque the isolation adaptor to the equipment to be monitored, and then torque the sensor to the adaptor. However, the present invention only requires the mounting base 110 to be torque mounted to the equipment. That saves time, effort, and preserves the frequency response by minimizing the material between the sensing element 150 and the equipment to be monitored. In addition, because of the integral design of the isolation elements, said isolation will not be affected if the base 116 comes loose from the mounting surface.

The connector 140 forms a cover that fits over the distal ends 135 of the case 130 to form a complete sealed enclosure of the interior space of the case 130. The connector 140 has a circular shape to match that of the case 130. The connector 140 has a small groove or inset at the outer circumference that forms a lip 142. The lip 142 receives the distal end 135 of the case 130, as best shown in FIG. 2. The connector 140 can then be welded to the case 130 to form a hermetic seal between the connector 140 and the case 130, with the sensing element 150 fully enclosed therein. The hermetic seal prevents the intrusion of gases or liquids which could damage the sensing element 150. The connector 140 has electronic leads 144 that extend from the exterior of the connector 140 to the interior of the case 130 without permitting the intrusion of gases or liquids into the interior space of the case 130 that might damage the sensing element 150. Electronic wires 146 extend from the sensing element 150 and connect with the leads 144 so that electronic signals can be passed between the sensing element 150 inside the case 130 and a device located outside the case 130. The outside surface of the connector 140 can be threaded to mate with a cable.

The electrically insulating pad 160 is an optional flat circular element that is positioned between the case 130 and the sensing element 150 inside the interior space of the case 130. Alternatively, the pad 160 can be replaced with a mixture of epoxy and insulating spheres where the spheres provide the required isolation spacing between the sensing element 150 and the case 130. More specifically, the pad 160 is located on the top surface 133 of the bottom portion 132 of the case 130, and the sensing element 150 sits on top of the pad 160. The pad 160 is circular to have the same shape as the sensing element 150 as well as the case 130, to minimize the amount of space required by the sensor assembly 100. The pad 160 provides electrical isolation between the case 130 and the sensing element 150. The pad 160 prevents voltage present on the mounting base 110 or the case 130 from reaching the sensing element 150. This prevents damage to the sensing element 150 internal components. The pad 160 is electrically insulating with a high dielectric constant, low dielectric loss, high dielectric strength, and high volume resistivity. Ideally, the pad 160 is also mechanically rigid to improve the frequency response of the vibration sensor 150. A mechanically soft electrically insulation material such as rubber would be too soft to allow measurement of high-frequency vibration signals.

The pad 160 has a diameter slightly smaller than the diameter of the top surface 133 of the bottom portion 132, is a minimum of 0.001 inches thick and typically less than 0.100 inches thick, which provides about 400V of isolation (though isolation can be provided in the range of 250-10,000 volts). In one embodiment, the pad 160 is made of aluminum oxide (Al2O3), which is both an electrical insulator and mechanically stiff, and is bonded to the case 130 and to the sensing element 150 with adhesive 162.

As shown in FIG. 3, the pad 160 can be flat and sized to have a slightly larger diameter than the diameter of the sensing element 150. However, other suitable sizes and shapes can be utilized, such as a square. And, the pad 160 can be differently shaped than the sensing element 150 and/or case 130. As shown in FIG. 2, an adhesive 162 is provided about the outer circumference or periphery of the pad 160 that extends up about the sides of the sensing element 150. The adhesive 162 couples the pad 160 to the inside of the case 130 and to the sensing element 150. The adhesive 162 can further insulate the sensing element 150 from at least a portion of the side wall 134 of the case 130.

The sensor bottom portion 152 is flat, with a flat bottom exterior surface. In addition, the sensor exterior side wall surface is straight and the case side wall interior surface 136 is straight. Accordingly, the flat sensor bottom exterior surface mates with the flat top surface of the pad 160, and the flat bottom surface of the pad 160 mates with the flat top surface 133 of the bottom portion 132 of the case 130 and those respective surfaces can be reliably adhered together by the adhesive 162. And, the straight case side wall interior surface 136 and the straight sensor exterior surface allow the sensor 150 to be received in the case 130, though those surfaces are not coupled together.

Thus, the sensor assembly 100 provides an insulative cup 120 between the mounting case 110 and the sensor element 150. The cup 120 insulates the sensing element 150 from any electrical signals that may be present on the mounting case 110, which can come from the mounting surface of the equipment or device to which the assembly 100 is mounted.

Though the invention has been described for use with a vibration sensor 150, it can be used with other components within the spirit and scope of the invention. In addition, the invention has been shown and described as having a series of components that are coupled to each other. The components can be similarly-shaped (a cup or U-shape) (including the mounting base 110, the cup 120, the case 130, and the sensing element housing 151) and are progressively smaller in size so that each successive component fits inside the prior component. Each component has an opening at one side formed by at least one side wall that receives the successive component. At least one of the components is an insulator to electrically insulate the final component (i.e., the sensing element 150). The components each have a bottom portion and at least one side wall, with the bottom portion having a flat top surface. The exterior bottom of the bottom portion or each successive component is also flat to be reliably adhered to the flat top surface of the prior component. However, other suitable components can be provided. For instance, the components need not have a cup or U-shape.

In operation, the sensor assembly 100 is assembled in any suitable manner. For instance, an adhesive bond 161 is applied to the bottom surface of the pad 160 and the pad 160 is then adhered to the top surface 133 of the bottom portion 132 of the case 130. An adhesive bond 162 is also applied to the bottom surface of the sensing element 150 and the sensing element 150 is adhered to the top surface of the pad 160. Alternatively, the pad 160 can be adhered to the sensing element 150 and the sensing element 150 with the pad 160 then adhered to the case 130. Thus, the pad 160 is surrounded by adhesive 161 on the bottom and adhesive 162 on the top, which also covers the side of the pad 160.

The wires 146 are connected to the interior portion of the leads 144 of the connector 140. The connector 140 is then fitted to the case 130 by aligning the lip 142 with the distal end 135 of the side wall 134. The connector 140 can then be welded to the distal end 135 to provide a hermetically sealed case 130 having the sensing element 150 and the pad 160 contained therein. An adhesive bond 172 is applied to the outside surface of the assembled case 130, including the side wall 134 and the bottom 132.

The assembled case 130 is then inserted into the interior space of the cup 120 so that the bottom exterior surface is adhered to the top surface 129 of the bottom portion 122 and the case side walls 134 are adhered to the interior surface 128 of the cup side walls 124. In addition, an adhesive bond 170 is applied to the bottom surface and exterior outer surface 126a of the cup. The cup 120 is then inserted into the interior space of the mounting base 110 so that the cup bottom surface adheres to the mounting base top surface 117 and the lower cup sides 126a are adhered to the interior side surface 118. It should be noted, however, that these steps can be performed in different orders. For instance, the cup can be adhered to the mounting base 110 before the case is adhered to the cup 120 or the sensor 150 is adhered to the pad 160. To further facilitate the assembly, the exterior bottom corners of the sensing device 150, case 130 and cup 120 can be rounded, angled or beveled to guide those components into their mating components. Likewise, the top inside corners of the distal ends of the side walls of the case 130, cup 120 and mounting base 110 can be rounded, angled or beveled to guide the components being received into the interior space of those components.

Once assembled, the sensor assembly 100 is ready for use. The assembly 100 can then be mounted to a mounting surface of a device or equipment that is to be monitored. Here, the threaded neck 112 of the mounting base 110 is screwed into a mating threaded opening in the mounting surface. A cable or wires can be coupled with the exterior portion of the leads 144 of the connector 140. The other end of the cable or wires can be connected to an auxiliary device such as a processing device (e.g., a computer or controller), meter or other electronic device. The sensing element 150 outputs a signal on the wires 146 of the vibration present on the equipment being monitored. That signal is transmitted via the leads 144 to the auxiliary device.

In addition, the isolating material can be glazed on its exposed surfaces to reduce surface contaminants from adhering to an isolating surface and reduce the isolation properties by providing a path for current to flow (leak) over the surface of the isolator.

The description and drawings of the present invention should be considered as illustrative only of the principles of the invention. The invention may be configured in a variety of ways, shapes and sizes, and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A sensor assembly for monitoring an equipment, comprising:
   a mounting base for mounting to the equipment, the mounting base having an open distal end and a side wall;
   an electrically insulative, mechanically rigid cup having an opening and a side wall, said cup coupled to said mounting base whereby at least a portion of the side wall of said cup extends through the open distal end of said mounting base and beyond the side wall of said mounting base, wherein the side wall of said cup has an outer surface with a plurality of transverse grooves at said at least a portion of the side wall of said cup extends beyond the side wall of said mounting base; and
   a sensor mounted at the opening of said insulative cup.

2. The assembly of claim 1, wherein said insulative cup comprises an amorphous solid or ceramic material.

3. The assembly of claim 1, further comprising a metal case forming an enclosure and having at least one side wall, said sensor received in the enclosure of said case whereby the case fully encloses said sensor, wherein said electrically insulative cup has an open distal end and the at least one side wall of said metal case extends through the open distal end of said electrically insulative cup beyond the side wall of said insulative cup.

4. The assembly of claim 3, further comprising an electrically insulative material coupled between said case and said sensor.

5. The assembly of claim 3, further comprising a connector forming a cover for said metal case, said connector having leads extending therethrough coupled with said sensor.

6. The assembly of claim 3, further comprising curved ridges on at least a portion of the outer surface.

7. The assembly of claim 1, wherein said cup is adhered to said mounting base.

8. A vibration sensor assembly for monitoring an equipment, comprising:
- a mounting base for mounting to the equipment, said mounting base having a proximal end with a bottom having a flat top surface, at least one side wall extending substantially perpendicularly upward from the bottom to form an interior space there between, and an open distal end;
- an electrically insulative, mechanically rigid cup having a flat bottom with a flat top surface, and said rigid cup having at least one elongated side wall extending substantially perpendicularly upward from the flat top surface of the flat bottom of said rigid cup to form an interior space there between, said rigid cup received in the interior space of said mounting base and coupled with the flat top surface of the bottom of said mounting base, wherein at least a portion of the at least one side wall of said rigid cup extends through the open distal end of said mounting base and beyond the at least one side wall of said mounting base, and wherein said at least one side wall of said rigid cup has an outer surface with a plurality of transverse grooves at said at least a portion of the at least one side wall of said cup that extends beyond the at least one side wall of said mounting base; and
- a vibration sensor coupled with said cup, said vibration sensor monitoring vibrations of the equipment.

9. The assembly of claim 8, wherein said insulative cup comprises an amorphous solid or ceramic material.

10. The assembly of claim 8, further comprising a metal case forming an enclosure and having at least one side wall, said vibration sensor received in the enclosure of said case whereby the case fully encloses said vibration sensor, wherein said flat bottom of said electrically insulative cup is solid and closed to form a closed proximal end and an open distal end and the at least one side wall of said metal case extends through the open distal end of said insulative cup beyond the at least one wall of said electrically insulative cup.

11. The assembly of claim 10, further comprising an electrically insulative material having a first side coupled to said metal case and a second side coupled to said sensor.

12. The assembly of claim 10, further comprising a connector forming a cover for said metal case, said connector having leads extending therethrough coupled with said vibration sensor.

13. The assembly of claim 8, wherein said cup is adhered to said mounting base.

14. The assembly of claim 8, wherein said cup provides voltage isolation between said sensor and the equipment.

15. The assembly of claim 8, wherein the mounting base is a solid, closed, contiguous piece.

16. The assembly of claim 8, wherein the flat bottom of the cup does not have any openings.

17. The assembly of claim 8, wherein said at least one side wall of said mounting base is shortened and said at least one side wall of said rigid cup is elongated.

18. The assembly of claim 8, wherein said at least one side wall of said mounting base is shorter than said bottom of said mounting base, and wherein said at least one side wall of said rigid cup is longer than said flat bottom of said rigid cup.

19. A method for electronically isolating a vibration sensor from a device being monitored by the vibration sensor, comprising:
- providing a mounting base for mounting to the device being monitored, the mounting base having at least one side wall and an open distal end;
- providing an electrically insulative, mechanically rigid cup coupled to said mounting base, the cup having an opening and at least one side wall with at least a portion that extends through the open distal end of the mounting base and beyond the at least one side wall of the mounting base, and wherein said at least one side wall of said rigid cup has an outer surface with a plurality of transverse grooves at said at least a portion of the at least one side wall of said cup that extends beyond the at least one side wall of said mounting base; and
- providing a vibration sensor coupled at the opening of the insulative cup, wherein the insulative cup protects the sensor from voltages present on a mounting surface of the device being monitored.

* * * * *